(12) United States Patent
Kato et al.

(10) Patent No.: US 8,936,666 B2
(45) Date of Patent: Jan. 20, 2015

(54) ADSORPTION AGENT FOR NOBLE METAL, METHOD FOR MANUFACTURING THE SAME, AND METHOD FOR RECOVERING NOBLE METAL

(75) Inventors: Hisaya Kato, Takahama (JP); Toshiyuki Morishita, Nagoya (JP); Kinya Atsumi, Okazaki (JP); Minoru Kurata, Nagoya (JP); Katsutoshi Inoue, Saga (JP); Hidetaka Kawakita, Saga (JP); Keisuke Ohto, Saga (JP)

(73) Assignees: Denso Corporation, Kariya (JP); Saga University, Saga (JP)

( * ) Notice: Subject to any disclaimer, the term of this patent is extended or adjusted under 35 U.S.C. 154(b) by 156 days.

(21) Appl. No.: 13/134,870

(22) Filed: Jun. 20, 2011

(65) Prior Publication Data

US 2011/0308355 A1 Dec. 22, 2011

(30) Foreign Application Priority Data

Jun. 22, 2010 (JP) .................................. 2010-141644
Feb. 4, 2011 (JP) .................................. 2011-23114

(51) Int. Cl.
*C22B 11/00* (2006.01)
*C12N 1/00* (2006.01)
*C22B 9/02* (2006.01)
*C12N 1/12* (2006.01)
*C02F 1/28* (2006.01)
*B01J 20/30* (2006.01)
(Continued)

(52) U.S. Cl.
CPC ............... *C02F 1/286* (2013.01); *B01J 20/305* (2013.01); *B01J 20/3078* (2013.01); *B01J 20/3085* (2013.01); *B01J 20/3204* (2013.01);
*B01J 20/3248* (2013.01); *C02F 3/322* (2013.01); *B01J 3/322* (2013.01); *B01J 2220/4843* (2013.01); *B01J 2220/4875* (2013.01); *C02F 2101/20* (2013.01)
USPC .......................... 75/300; 435/257.1; 435/317.1

(58) Field of Classification Search
USPC ............................................................ 75/300
See application file for complete search history.

(56) References Cited

U.S. PATENT DOCUMENTS 4,992,207 A * 2/1991 Darnall et al. ................. 516/101
5,162,105 A 11/1992 Kleid et al.
(Continued)

FOREIGN PATENT DOCUMENTS

CN 101249421 8/2008
GB 1370446 9/1971
(Continued)

OTHER PUBLICATIONS

Derwent Acc-No. 2010-D79798 for the patent family including WO 2010035823 A1 published Apr. 10, 2010.*
(Continued)

*Primary Examiner* — George Wyszomierski
*Assistant Examiner* — Tima M McGuthry Banks
(74) *Attorney, Agent, or Firm* — Harness, Dickey & Pierce, PLC

(57) ABSTRACT

A noble metal adsorption agent includes algae or residue of algae having an amino group as a functional group. A noble metal is retrieved by a method including: adsorbing the noble metal on the noble metal adsorption agent; and retrieving the noble metal. The noble metal is solved in a liquid. Thus, by using the noble metal adsorption agent, the noble metal is selectively retrieved.

4 Claims, 11 Drawing Sheets

(51) Int. Cl.
 *B01J 20/32* (2006.01)
 *C02F 3/32* (2006.01)
 *C02F 101/20* (2006.01)

(56) References Cited

U.S. PATENT DOCUMENTS

| | | | |
|---|---|---|---|
| 6,787,147 B1 * | 9/2004 | Huner et al. | 424/401 |
| 2010/0291167 A1 * | 11/2010 | Iida et al. | 424/401 |

FOREIGN PATENT DOCUMENTS

| | | |
|---|---|---|
| GB | 1395462 | 7/1973 |
| JP | 64-015133 | 1/1989 |
| JP | 64-15133 | 1/1989 |
| JP | 08-026713 | 1/1996 |
| JP | 2007-185552 | 7/2007 |

OTHER PUBLICATIONS

Ewers, Johannes, and Georg Wiechers. "Power Engineering International." Algae: Putting Carbon Dioxide in a Bind. N.p., Jan. 3, 2009. Web. Sep. 18, 2013. <http://www.powerengineeringint.com/articles/print/volume-17/issue-3/germany-focus/algae-putting-carbon-dioxide-in-a-bind.html>.*

Office Action issued May 6, 2013 and Search Report from SIPO in corresponding Chinese Application No. 201110204483.3 (both with English translations).

Greene, Benjamin et al., "Interaction of Gold(I) and Gold(III) Complexes with Algal Biomass," Dept. of Chemistry, New Mexico State University, Las Cruces, NM 88003; Environ. Sci. Technol., vol. 20, No. 6 (1986), pp. 627-632 (CPCH1161666).

Office Action issued in Chinese patent application No. 201110204483.3 dated Jan. 21, 2014 with English translation.

Gupta, V.K., Rastogi, A., "Biosorption of hexavalent chromium by raw and acid-treated green alga *Oedogonium hatei* from aqueous solutions", Journal of Hazardous Materials, pp. 396-402, Jul. 3, 2008.

Mehta, S.K., Tripathi, B.N., Gaur, J.P., "Enhanced sorption of Cu2+ and Ni2+ by acid-pretreated *Chlorella vulgaris* from single and binary metal solutions", Journal of Applied Phycology 14: pp. 267-273, Dec. 31, 2002.

Office Action dated Aug. 19, 2014 in corresponding Japanese Application No. 2011-023114.

Office Action dated Aug. 14, 2014 in corresponding CN Application No. 201110204483.3 with English translation.

* cited by examiner

FIG. 13

| NAME OF AGENT | DIP CONDITION | | ADSORPTION AMOUNT (mol/g) | | | |
|---|---|---|---|---|---|---|
| | TEMP OF CON H$_2$SO$_4$ (°C) | DIP TIME | HCL CON=0.1M | | HCL CON=2M | |
| | | | Au | Pd | Au | Pd |
| 4A-1 | 100 | 1min | 0.20 | 0.043 | 0.19 | 0.016 |
| 4A-2 | 100 | 3min | 0.20 | 0.045 | 0.20 | 0.012 |
| 4A-3 | 100 | 1hr | 0.20 | 0.041 | 0.20 | 0.011 |
| 4A-4 | 100 | 3hr | 0.20 | 0.038 | 0.20 | 0.011 |
| 4A-5 | 100 | 6hr | 0.20 | 0.052 | 0.20 | 0.015 |
| 4A-6 | 100 | 12hr | 0.20 | 0.034 | 0.20 | 0.010 |
| (2A) | 100 | 24hr | 0.10 | 0.038 | 0.10 | 0.018 |
| 4A-7 | 100 | 48hr | - | - | - | - |
| 4A-8 | 80 | 24hr | 0.20 | 0.032 | 0.20 | 0.003 |
| 4A-9 | 120 | 3hr | 0.20 | 0.042 | 0.20 | 0.004 |
| 4A-10 | 140 | 1hr | 0.20 | 0.041 | 0.20 | 0.005 |

ADSORPTION AGENT FOR NOBLE METAL, METHOD FOR MANUFACTURING THE SAME, AND METHOD FOR RECOVERING NOBLE METAL

CROSS REFERENCE TO RELATED APPLICATIONS

This application is based on Japanese Patent Applications No. 2010-141644 filed on Jun. 22, 2010, and No. 2011-23114 filed on Feb. 4, 2011, the disclosures of which are incorporated herein by reference.

TECHNICAL FIELD

The present invention relates to an adsorption agent for a noble metal, a method for manufacturing an adsorption agent, and a method for recovering a noble metal.

BACKGROUND

In a manufacturing process for an electric device and a process for plating with a noble metal, waste fluid of cleaning liquid for a product may include a noble metal, and the waste fluid is discarded. In view of economic efficiency and environmental conservation, it is required to recover the noble metal in the waste fluid.

Conventionally, a method for recovering the noble metal is, for example, a method with using active charcoal, an ion exchanging method, or a solvent extraction method. The method with using active charcoal and an ion exchanging method have difficulty with poor selectivity with respect to the noble metal. The solvent extraction method is only applicable for a solution with comparatively high concentration. Further, the extraction solvent soluble in water. Accordingly, environmental load is large. Further, a cost for processing waste fluid of the extraction solvent is high.

JP-A-S64-15133 teaches an adsorption agent for noble metal, which is dry powder having a diameter in a range between 150 micrometers and 300 micrometers. The dry power is made from blue-green algaee (i.e., cyanobacteria), red algaee (i.e., rhodophyte), brown algaee (i.e., phaeophytes), dinoflagellata or green algaee (i.e., chlorophyta). Gold, silver and platinum in solution are adsorbed on the adsorption agent, and then, gold, silver and platinum are recovered.

However, in the above recovering method, multiple noble metals are mixed, and therefore, the mixed noble metals are recovered. Thus, it is difficult to separate and recover a specific noble metal from other noble metals.

SUMMARY

In view of the above-described problem, it is an object of the present disclosure to provide an adsorption agent for a noble metal, a method for manufacturing an adsorption agent, and a method for recovering a noble metal. With using the adsorption agent and by the method for recovering the noble metal, a specific noble metal is separated and recovered from other noble metal.

According to a first aspect of the present disclosure, a noble metal adsorption agent includes: algaee or residue of algaee having an amino group as a functional group. By using the noble metal adsorption agent, a noble metal is selectively retrieved from base metals.

According to a second aspect of the present disclosure, a noble metal adsorption agent includes: a component, which is prepared by processing algaee having an amino group as a functional group with strong acid. The strong acid has an acid level equal to or higher than a predetermined acid level. Here, the processing of the algae with the strong acid is defined as an insoluble treatment. By using the noble metal adsorption agent, a noble metal is selectively retrieved from base metals.

According to a third aspect of the present disclosure, a noble metal adsorption agent includes: a component, which is prepared by carbonizing algae or residue of algae having an amino group as a functional group. By using the noble metal adsorption agent, a noble metal is selectively retrieved from base metals.

According to a fourth aspect of the present disclosure, a method for retrieving a noble metal includes: adsorbing the noble metal on the noble metal adsorption agent according to the first aspect of the present disclosure; and retrieving the noble metal. The noble metal is solved in a liquid. By using the noble metal adsorption agent, a noble metal is selectively retrieved from base metals.

According to a fifth aspect of the present disclosure, a method for retrieving a noble metal includes: pouring the noble metal adsorption agent according to the second aspect of the present disclosure in a liquid, which includes an element of gold and has a hydrochloric acid concentration equal to or higher than 2 mol/L; adsorbing the element of gold on the noble metal adsorption agent; and retrieving the element of gold. By using the noble metal adsorption agent, a noble metal is selectively retrieved from base metals. Further, the element of gold is selectively retrieved from other noble metals.

According to a sixth aspect of the present disclosure, a method for retrieving a noble metal includes: pouring the noble metal adsorption agent according to the first aspect of the present disclosure in a liquid, which includes an element of palladium and has a hydrochloric acid concentration lower than 2 mol/L; adsorbing the element of palladium on the noble metal adsorption agent; and retrieving the element of palladium. By using the noble metal adsorption agent, a noble metal is selectively retrieved from base metals.

According to a seventh aspect of the present disclosure, a method for retrieving a noble metal includes: pouring the noble metal adsorption agent according to the second aspect of the present disclosure in a liquid, which includes an element of gold and an element of palladium and has a hydrochloric acid concentration equal to or higher than 2 mol/L, wherein the noble metal adsorption agent according to the second aspect of the present disclosure is defined as a first noble metal adsorption agent; adsorbing the element of gold on the first noble metal adsorption agent; retrieving the element of gold; reducing the hydrochloric acid concentration lower than 2 mol/L after the retrieving of the element of gold; pouring the noble metal adsorption agent according to the first aspect of the present disclosure in the liquid after the reducing of the hydrochloric acid concentration lower than 2 mol/L, wherein the noble metal adsorption agent according to the first aspect of the present disclosure is defined as a second noble metal adsorption agent; adsorbing the element of palladium on the second noble metal adsorption agent; and retrieving the element of palladium. By using the first and second noble metal adsorption agents, the elements of gold and palladium are selectively retrieved from base metals. Further, the element of gold is retrieved, and the element of palladium is retrieved independently. Thus, the elements of gold and palladium are separately retrieved.

According to a eight aspect of the present disclosure, a method for retrieving a noble metal includes: pouring the noble metal adsorption agent according to the second aspect of the present disclosure in a liquid, which includes an element of gold, an element of palladium and an element of platinum, and has a hydrochloric acid concentration equal to or higher than 2 mol/L, wherein the noble metal adsorption agent according to the second aspect of the present disclosure is defined as a first noble metal adsorption agent; adsorbing the element of gold on the first noble metal adsorption agent; retrieving the element of gold; reducing the hydrochloric acid concentration lower than 2 mol/L after the retrieving of the element of gold; pouring the noble metal adsorption agent according to the first aspect of the present disclosure in the liquid after the reducing of the hydrochloric acid concentration lower than 2 mol/L, wherein the noble metal adsorption agent according to the first aspect of the present disclosure is defined as a second noble metal adsorption agent; adsorbing the element of palladium on the second noble metal adsorption agent; retrieving the element of palladium; pouring the noble metal adsorption agent according to the third aspect of the present disclosure in the liquid after the retrieving of the element of palladium, wherein the noble metal adsorption agent according to the third aspect of the present disclosure is defined as a third noble metal adsorption agent; adsorbing the element of platinum on the third noble metal adsorption agent; and retrieving the element of platinum. By using the first to third noble metal adsorption agents, the elements of gold, palladium and platinum are selectively retrieved from base metals. Further, the element of gold is retrieved, the element of palladium is retrieved, and the element of platinum is retrieved, independently. Thus, the elements of gold, palladium and platinum are separately retrieved.

According to a ninth aspect of the present disclosure, a method for manufacturing a noble metal adsorption agent includes: retrieving a micro algae by a centrifugal separation method or by using flocculant; drying a retrieved micro algae; crushing a dried micro algae so that a diameter of the micro algae becomes about 100 micrometers; dipping a crushed micro algae in organic solvent prepared by mixing chloroform and methanol with a ratio between chloroform and methanol of 2:1 so that an oily component of the micro algae is solved into the organic solvent; evaporating the organic solvent so that the oily component is retrieved; and removing the oil from the oily component so that a residue of the micro algae is obtained. The residue of the micro algae provides the noble metal adsorption agent. By using the noble metal adsorption agent, a noble metal is selectively retrieved from base metals.

BRIEF DESCRIPTION OF THE DRAWINGS

The above and other objects, features and advantages of the present invention will become more apparent from the following detailed description made with reference to the accompanying drawings. In the drawings:

FIG. 13 is a diagram showing an adsorption amount of various agents in various conditions.

DETAILED DESCRIPTION

Figure 1:
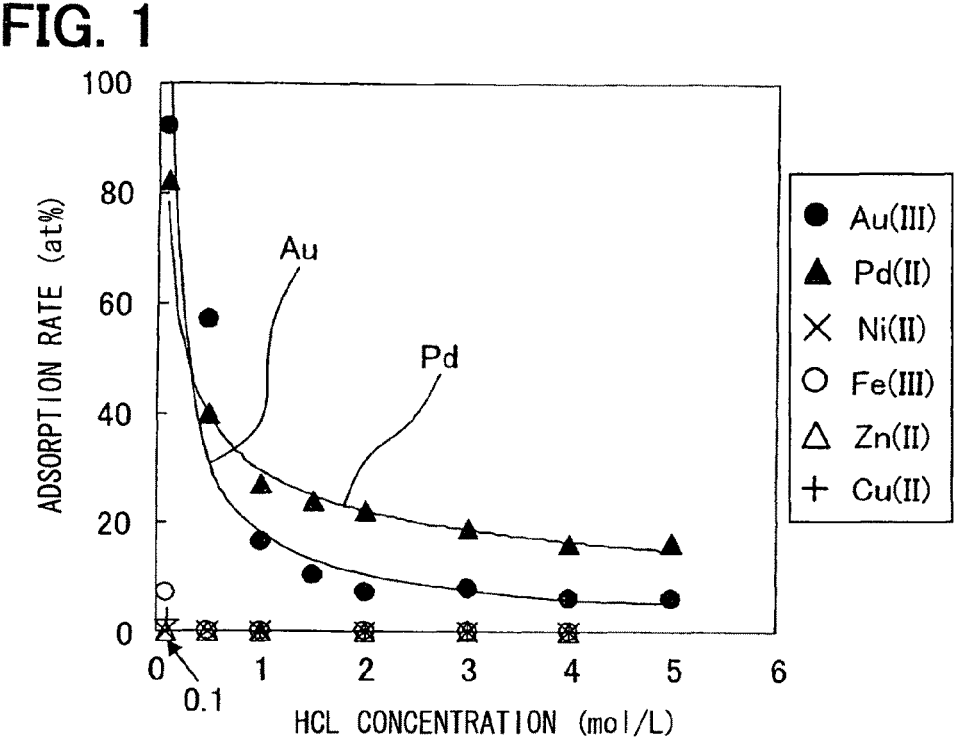
FIG. 1 is a graph showing an adsorption rate of a noble metal adsorption agent A1.

1. Manufacturing Method of Noble Metal Adsorption Agent (1-1) Noble Metal Adsorption Agent 1A A following micro algae is prepared.

International Deposition number: FERM BP-10484

Genus: *Pseudochoricystis*

Species: *Ellipsoidea*

Strain: MBIC11204

The above micro algae is retrieved by a centrifugal separation method. Alternatively, the micro algae may be retrieved with using flocculant. The flocculant is, for example, aluminum sulfate series flocculant, cationic polymer flocculant, or ampholytic polymer flocculant.

After the retrieved micro algae is dried, the dried micro algae is crushed with a mortar so that a diameter of the micro algae becomes about 100 micrometers. After that, the crushed micro algae is dipped in organic solvent prepared by mixing chloroform and methanol with a ratio between chloroform and methanol of 2:1 (i.e., two parts chloroform with one part methanol) so that an oily component of the micro algae is solved into the organic solvent. Then, the organic solvent is evaporated so that the oily component is retrieved. Then, the oil is removed from the oily component so that a residue of the micro algae is obtained. This residue of the micro algae is defined as noble metal adsorption agent 1A.

(1-2) Noble Metal Adsorption Agent 1B

A following micro algae is prepared. Further, similar to the above manufacturing method of the noble metal adsorption agent 1A, the noble metal adsorption agent 1B is obtained.

International Deposition number: FERM BP-10485

Genus: *Pseudochoricystis*

Species: *Ellipsoidea*

Strain: MBIC11220

(1-3) Noble Metal Adsorption Agent 2A

The noble metal adsorption agent 1A is dipped in concentrated sulfuric acid at 100° C. for 24 hours. At this time, in the noble metal adsorption agent 1A, it is considered that a pair of hydroxyl groups is reacted with each other by condensation reaction so that a bridge formation is generated. After that, the noble metal adsorption agent 1A in the concentrated sulfuric acid is neutralized with sodium hydrogen carbonate (i.e., sodium bicarbonate). The neutralized concentrated sulfuric acid with the noble metal adsorption agent 1A is filtered and dried. Thus, the noble metal adsorption agent 2A is obtained.

(1-4) Noble Metal Adsorption Agent 2B

The noble metal adsorption agent 1B is dipped in concentrated sulfuric acid at 100° C. for 24 hours. At this time, in the noble metal adsorption agent 1B, it is considered that a pair of hydroxyl groups is reacted with each other by condensation reaction so that a bridge formation is generated. After that, the noble metal adsorption agent 1A in the concentrated sulfuric acid is neutralized with sodium hydrogen carbonate (i.e., sodium bicarbonate). The neutralized concentrated sulfuric acid with the noble metal adsorption agent 1A is filtered and dried. Thus, the noble metal adsorption agent 2B is obtained.

(1-5) Noble Metal Adsorption Agent 3A

The noble metal adsorption agent 1A is heated at 800° C. in atmosphere without oxygen substantially so that oxidation of the noble metal adsorption agent 1A is restricted. Thus, the noble metal adsorption agent 1A is carbonized. This process is defined as a carbonizing process. The carbonizing process is performed by an electric furnace. The carbonized noble metal adsorption agent 1A is defined as the noble metal adsorption agent 3A.

(1-6) Noble Metal Adsorption Agent 3B

The noble metal adsorption agent 1B is heated at 800° C. in atmosphere without oxygen substantially so that oxidation of the noble metal adsorption agent 1B is restricted. Thus, the noble metal adsorption agent 1B is carbonized. This process is defined as a carbonizing process. The carbonizing process is performed by an electric furnace. The carbonized noble metal adsorption agent 1A is defined as the noble metal adsorption agent 3B.

(1-7) Noble Metal Adsorption Agents 4A-1 to 4A-10

The noble metal adsorption agent 1A is dipped in concentrated sulfuric acid. The dipping conditions, i.e., the temperature of the concentrated sulfuric acid and the dipping time are shown in FIG. 13. Thus, under various dipping conditions, the dipping process of the noble metal adsorption agent 1A is performed.

When the noble metal adsorption agent 1A is dipped in concentrated sulfuric acid, it is considered that a pair of hydroxyl groups is reacted with each other by condensation reaction so that a bridge formation is generated. After that, the noble metal adsorption agent 1A in the concentrated sulfuric acid is neutralized with sodium hydrogen carbonate (i.e., sodium bicarbonate). The neutralized concentrated sulfuric acid with the noble metal adsorption agent 1A is filtered and dried. Thus, the noble metal adsorption agents 4A-1 to 4A-10 are obtained according to various dipping conditions.

(1-8) Noble Metal Adsorption Agent 1C

A micro algae is chlorella. Similar to the manufacturing method of noble metal adsorption agent 1A, the noble metal adsorption agent 1C is obtained.

The chlorella is fresh chlorella-V12 (which is a name of product) manufactured by Chlorella Industry Co., Ltd. The genus, the species and the strain of the chlorella is defined as chlorella vulgaris chikugo strain.

(1-9) Noble Metal Adsorption Agent 2C

The noble metal adsorption agent 1C is dipped in concentrated sulfuric acid at 100° C. for 24 hours. At this time, in the noble metal adsorption agent 1C, it is considered that a pair of hydroxyl groups is reacted with each other by condensation reaction so that a bridge formation is generated. After that, the noble metal adsorption agent 1C in the concentrated sulfuric acid is neutralized with sodium hydrogen carbonate (i.e., sodium bicarbonate). The neutralized concentrated sulfuric acid with the noble metal adsorption agent 1C is filtered and dried. Thus, the noble metal adsorption agent 2C is obtained.

2. Recovering Method of Noble Metal with Using a Noble Metal Adsorption Agent (2-1) In Case of Noble Metal Adsorption Agent 1A Liquid including aqua regalis (i.e., nitrophydrochloric acid) and elements of Au (i.e., gold), Pd (i.e., palladium), Cu (i.e., copper), Zn (i.e., zinc), Fe (i.e., iron) and Ni (i.e., nickel) is prepared. The concentration of each element in the liquid is 0.2 m mol/L. 10 mg of the noble metal adsorption agent 1A is poured in 5 ml of the liquid. Then, the liquid with the noble metal adsorption agent 1A is agitated for five hours at 30° C. After that the agitated liquid is statically placed for five minutes. After that, deposit generated in the liquid is retrieved.

The concentration of the noble metal in the liquid before the noble metal adsorption agent 1A is poured in the liquid is defined as an initial concentration, and measured by an atomic absorption photometer and/or an inductively-coupled plasma (i.e., ICP) atomic emission spectroscopy analysis equipment. The concentration of the noble metal in the liquid after the deposit is retrieved from the liquid is defined as an after-retrieved concentration, and measured by the atomic absorption photometer and/or the inductively-coupled plasma atomic emission spectroscopy analysis equipment. They difference between the initial concentration and the after-retrieved concentration is calculated. Then, an adsorption amount is calculated from a ratio between the difference and the poured amount of the noble metal adsorption agent 1A. Further, an adsorption rate is defined by dividing the difference between the initial concentration and the after-retrieved concentration with the initial concentration. The unit of the adsorption rate is at %.

The above adsorption rate is measured under various conditions of the hydrochloric acid concentration in the liquid (i.e., the hydrochloric acid concentration in the aqua regalis). The conditions of the hydrochloric acid concentration in the liquid are 5 mol/L, 4 mol/L, 3 mol/L, 2 mol/L, 1 mol/L, 0.5 mol/L, and 0.1 mol/L. The results of the measurements of the adsorption rate are shown in FIG. 1. As shown in FIG. 1, the elements of Au and Pd are selectively retrieved. Specifically, when the hydrochloric acid concentration (HCl concentration) is low, the adsorption rate of the elements of Au and Pd is high. Alternatively, when the noble metal adsorption agent 1B instead of the noble metal adsorption agent 1A is used, the results of the adsorption rate of the elements of Au and Pd are similar to the case of the noble metal adsorption agent 1A.

(2-2) In Case of Noble Metal Adsorption Agent 2A

Figure 2:
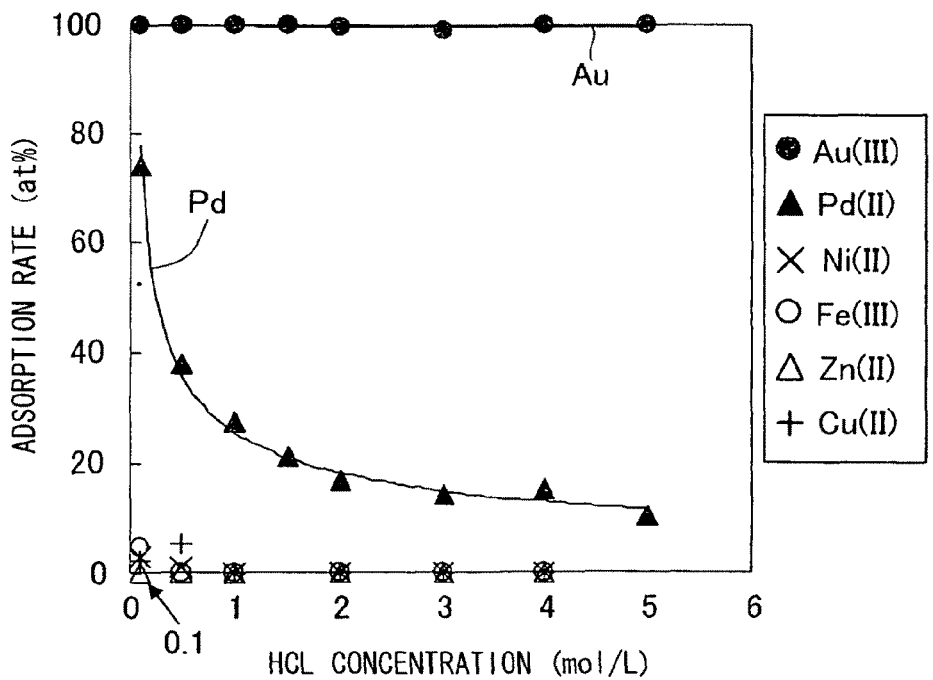
FIG. 2 is a graph showing an adsorption rate of a noble metal adsorption agent A2.

The noble metal adsorption agent 2A instead of the noble metal adsorption agent 1A is used, and the retrieving process of the noble metal is performed similar to the case of the noble metal adsorption agent 1A. The results of the measurements of the adsorption rate are shown in FIG. 2. As shown in FIG. 2, the elements of Au and Pd are selectively retrieved. Specifically, the element of Au is selectively retrieved compared with the element of Pd when the hydrochloric acid concentration (HCl concentration) is high. Alternatively, when the noble metal adsorption agent 2B instead of the noble metal adsorption agent 1B is used, the results of the adsorption rate of the elements of Au and Pd are similar to the case of the noble metal adsorption agent 1B.

(2-3) In Case of Noble Metal Adsorption Agent 3A

Liquid including aqua regalis (i.e., nitrophydrochloric acid) and elements of Au, Pd, Pt (i.e., platinum), Cu, Zn, Fe and Ni is prepared. The concentration of each element in the liquid is 0.2 m mol/L. 10 mg of the noble metal adsorption agent 3A is poured in 5 ml of the liquid. Then, the liquid with the noble metal adsorption agent 3A is agitated for five hours at 30° C. After that the agitated liquid is statically placed for five minutes. After that, deposit generated in the liquid is retrieved.

The concentration of the noble metal in the liquid before the noble metal adsorption agent 3A is poured in the liquid is defined as an initial concentration, and measured by the atomic absorption photometer and/or the inductively-coupled plasma (i.e., ICP) atomic emission spectroscopy analysis equipment. The concentration of the noble metal in the liquid after the deposit is retrieved from the liquid is defined as an after-retrieved concentration, and measured by the atomic absorption photometer and/or the inductively-coupled plasma atomic emission spectroscopy analysis equipment. The difference between the initial concentration and the after-retrieved concentration is calculated. Then, an adsorption amount is calculated from a ratio between the difference and the poured amount of the noble metal adsorption agent 3A. Further, an adsorption rate is defined by dividing the difference between the initial concentration and the after-retrieved concentration with the initial concentration. The unit of the adsorption rate is at %.

Figure 3:
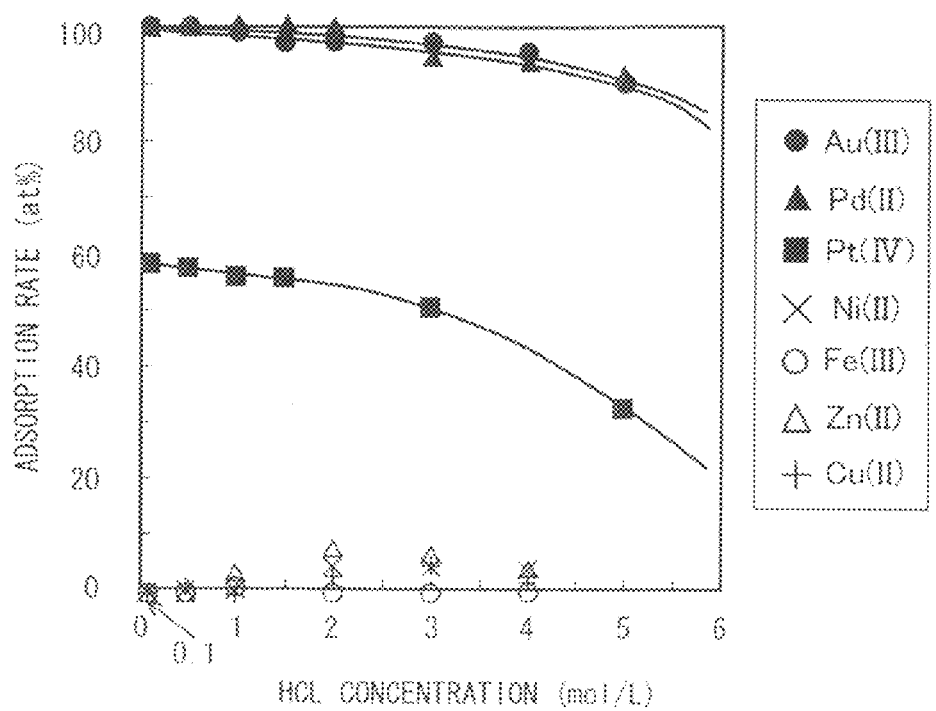
FIG. 3 is a graph showing an adsorption rate of a noble metal adsorption agent A3.

The above adsorption rate is measured under various conditions of the hydrochloric acid concentration in the liquid (i.e., the hydrochloric acid concentration in the aqua regalis). The conditions of the hydrochloric acid concentration in the liquid are 5 molL, 4 mol/L, 3 mol/L, 2 mol/L, 1 mol/L, 0.5 mol/L, and 0.1 mol/L. The results of the measurements of the adsorption rate are shown in FIG. 3. As shown in FIG. 3, the elements of Au, Pd and Pt are selectively retrieved. Specifically, when the hydrochloric acid concentration (HCl concentration) is low, the adsorption rate of the elements of Au, Pd and Pt is high. Further, although it is difficult to retrieve the element of Pt with using the noble metal adsorption agents 1A, 1B, 2A and 2B, the element of Pt can be retrieved with using the noble metal adsorption agent 1C. Alternatively, when the noble metal adsorption agent 3B instead of the noble metal adsorption agent 3A is used, the results of the adsorption rate of the elements of Au, Pd and Pt are similar to the case of the noble metal adsorption agent 3A.

Figure 4:
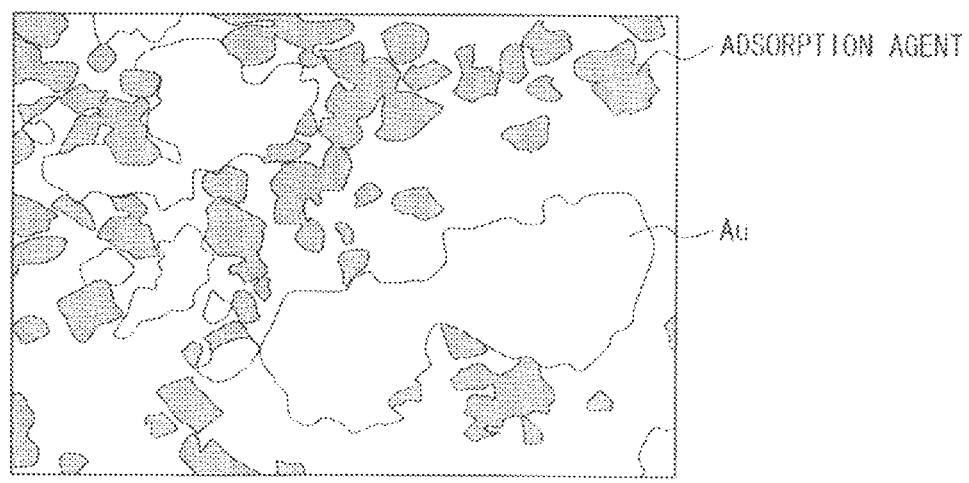
FIG. 4 is a diagram showing a deposit X.

(2-4) In Case of Combination of Noble Metal Adsorption Agents 1A-3A (i) First Step Liquid including aqua regalis (i.e., nitrophydrochloric acid) and elements of Au, Pd, Pt, Cu, Zn, Fe and Ni is prepared. The concentration of each element in the liquid is 0.2 m mol/L. The HCl concentration of the liquid is 5 mol/L. 10 mg of the noble metal adsorption agent 2A is poured in 5 ml of the liquid. Then, the liquid with the noble metal adsorption agent 2A is agitated for five hours at 30° C. After that the agitated liquid is statically placed for five minutes. After that, deposit generated in the liquid is retrieved. The deposit is defined as deposit X. The deposit X includes the element of Au selectively. This result is derived from the property of the noble metal adsorption agent 2A such that the element of Au is selectively retrieved when the hydrochloric acid concentration (HCl concentration) is high. FIG. 4 shows a picture of the deposit X including the element Au. As shown in FIG. 4, the deposit X includes the element Au.

In the first step, the noble metal adsorption agent 2B instead of the noble metal adsorption agent 2A may be used. In this case, the results of the adsorption rate of the element of Au are similar to the case of the noble metal adsorption agent 2A.

(ii) Second Step

After the deposit X is retrieved, water is added in the liquid so that the liquid is diluted. Thus, the HCl concentration in the liquid becomes 0.1 mol/L. 10 mg of the noble metal adsorption agent 2A is again poured in the liquid. Then, the liquid with the noble metal adsorption agent 2A is agitated for five hours at 30° C. After that the agitated liquid is statically placed for five minutes. After that, deposit generated in the liquid is retrieved. The deposit is defined as deposit Y. The deposit Y includes the element of Pd selectively. This result is derived from the property of the noble metal adsorption agent 2A such that the Adsorption performance of the elements of Au and Pd is high when the hydrochloric acid concentration (HCl concentration) is 0.1 mol/L. Further, since the element of Au is already retrieved in the first step, the deposit Y includes the element of Pd selectively.

A method for separating the element of Pd from the deposit Y is described as follows. Specifically, the deposit Y is poured in the ammonia water. The concentration of the ammonia water is 10%. Then, the ammonia water with the deposit Y is agitated, and then, heated and dried. As a result, the element of Pd is separated from the noble metal adsorption agent 2A, and therefore, the element of Pd is retrieved as powder.

In the second step, the noble metal adsorption agent 2B, 1A or 1B instead of the noble metal adsorption agent 2A may be used. In this case, the results of the retrieval of the element of Pd are similar to the case of the noble metal adsorption agent 2A.

(iii) Third Step

After the deposit Y is retrieved, 10 mg of the noble metal adsorption agent 3A is poured in the liquid. Then, the liquid with the noble metal adsorption agent 3A is agitated for five hours at 30° C. After that the agitated liquid is statically placed for five minutes. After that, deposit generated in the liquid is retrieved. The deposit is defined as deposit Z. The deposit Z includes the element of Pt selectively based on the analysis of the deposit Z. This result is derived from the property of the noble metal adsorption agent 3A such that the Adsorption performance of the elements of Au, Pd and Pt is high. Further, since the element of Au is already retrieved in the first step, and the element of Pd is retrieved in the second step, the deposit Z includes the element of Pt selectively.

In the third step, the noble metal adsorption agent 3B instead of the noble metal adsorption agent 3A may be used. In this case, the results of the retrieval of the element of Pt are similar to the case of the noble metal adsorption agent 3A.

(2-4) In Case of Noble Metal Adsorption Agents 4A-1 to 4A-10

Liquid including aqua regalis (i.e., nitrophydrochloric acid) and elements of Au, Pd, Cu, Zn, Fe and Ni is prepared. The concentration of each element in the liquid is 0.2 m mol/L. 10 mg of the noble metal adsorption agent 4A-1 is poured in 10 ml of the liquid. Then, the liquid with the noble metal adsorption agent 4A-1 is agitated for five hours at 30° C. After that the agitated liquid is statically placed for five minutes. After that, deposit generated in the liquid is retrieved.

The concentration of the noble metal in the liquid before the noble metal adsorption agent 4A-1 is poured in the liquid is defined as an initial concentration, and measured by the atomic absorption photometer and/or the inductively-coupled plasma (i.e., ICP) atomic emission spectroscopy analysis equipment. The concentration of the noble metal in the liquid after the deposit is retrieved from the liquid is defined as an after-retrieved concentration, and measured by the atomic absorption photometer and/or the inductively-coupled plasma atomic emission spectroscopy analysis equipment. The difference between the initial concentration and the after-retrieved concentration is calculated. Then, an adsorption amount is calculated from a ratio between the difference and the poured amount of the noble metal adsorption agent 4A-1. The unit of the adsorption amount is mol/g.

The above adsorption amount is measured under various conditions of the hydrochloric acid concentration in the liquid (i.e., the hydrochloric acid concentration in the aqua regalis). The conditions of the hydrochloric acid concentration in the liquid are 0.1M and 2M.

Further, the noble metal adsorption agents 4A-2 to 4A-10 instead of the noble metal adsorption agent 4A-1 are used, and the noble metal is retrieved with using the noble metal adsorption agents 4A-2 to 4A-10. The adsorption amount is measured. The results of the measurements of the adsorption amount with using the noble metal adsorption agents 4A-1 to 4A-10 are shown in FIG. 13.

As shown in FIG. 13, even when any one of the noble metal adsorption agents 4A-1 to 4A-10 is used, the elements of Au and Pd are selectively retrieved.

Specifically, when the HCl concentration is high, the element of Au is selectively retrieved compared with the element of Pd.

(2-6) In Case of Different Temperature of Liquid (i)

Figure 6:
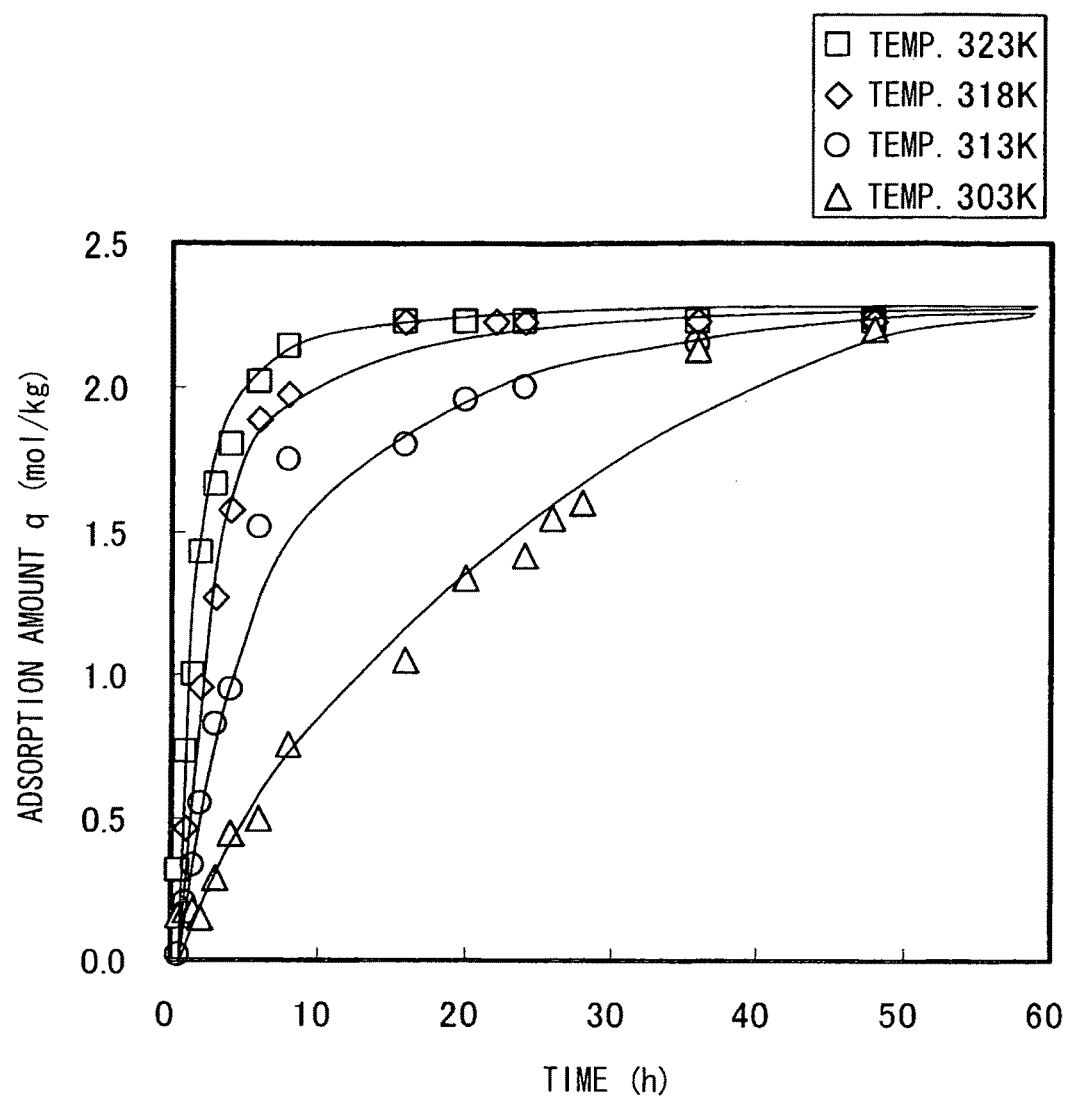
FIG. 6 is a graph showing a relationship between an adsorption speed of a noble metal and liquid temperature.

Liquid including aqua regalis (i.e., nitrophydrochloric acid) and element of Au is prepared. The concentration of the element of Au in the liquid is 2.2 m mol/L. 100 mg of the noble metal adsorption agent 1A is poured in 100 ml of the liquid. Then, the liquid with the noble metal adsorption agent 1A is agitated for a predetermine time L at predetermined temperature T. Specifically, under a condition that the temperature of the liquid is maintained at the predetermined temperature T, the liquid with the noble metal adsorption agent 1A is agitated for a predetermine time L. After that the agitated liquid is statically placed for five minutes. The HCl concentration is 0.1 mol/L. After that, deposit generated in the liquid is retrieved. The element of metal is separated from the deposit. Thus, the adsorption amount of the noble metal adsorption agent 1A is measured. The temperature T is set to be 30° C., 40° C., 45° C. or 50° C. The predetermine time L is set to be in a range between 0 and 48 hours. Thus, the experiments under various conditions are performed. The results of the experiments are shown in FIG. 6. In FIG. 6, the horizontal axis represents the predetermine time L, and the vertical axis represents the adsorption amount.

As shown in FIG. 6, as the temperature increases, the adsorption speed of the noble metal with respect to the noble metal adsorption agent is improved.

(ii)

Figure 7:
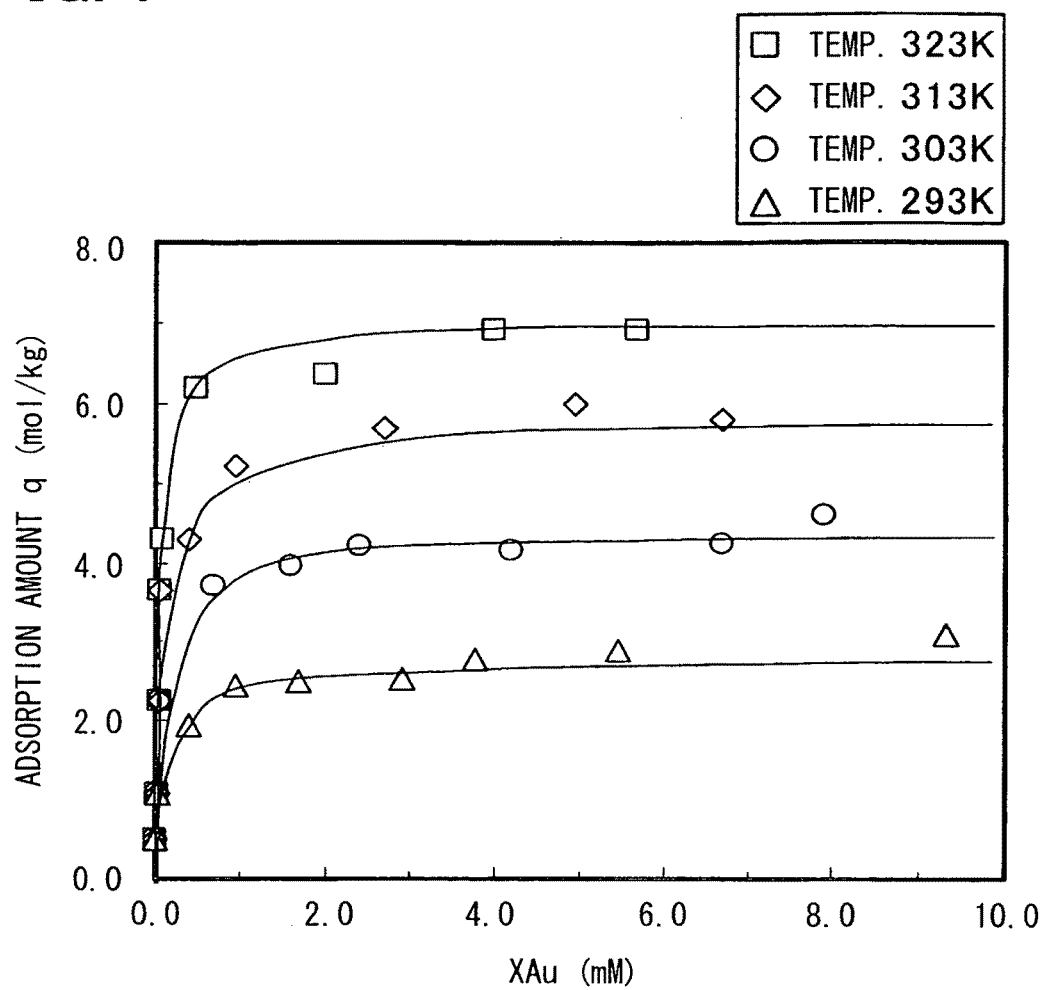
FIG. 7 is a graph showing a relationship between an adsorption amount of a noble metal and liquid temperature.

Liquid including aqua regalis (i.e., nitrophydrochloric acid) and element of Au is prepared. The concentration of the element of Au in the liquid is defined as XAu. 10 mg of the noble metal adsorption agent 1A is poured in 10 ml of the liquid. Then, the liquid with the noble metal adsorption agent 1A is agitated for 100 hours at predetermined temperature T. Specifically, under a condition that the temperature of the liquid is maintained at the predetermined temperature T, the liquid with the noble metal adsorption agent 1A is agitated for 100 hours. After that the agitated liquid is statically placed for five minutes. The HCl concentration is 0.5 mol/L. After that, deposit generated in the liquid is retrieved. The element of metal is separated from the deposit. Thus, the adsorption amount of the noble metal adsorption agent 1A is measured. The Au concentration XAu is set to be in a range between 0.01 m mol/L and 9 m mol/L. The temperature T is set to be 20° C., 30° C., 40° C. or 50° C. Thus, the experiments under various conditions are performed. The results of the experiments are shown in FIG. 7. In FIG. 7, the horizontal axis represents the Au concentration XAu, and the vertical axis represents the adsorption amount. As shown in FIG. 7, as the temperature increases, the adsorption volume of the noble metal with respect to the noble metal adsorption agent is improved.

(2-7) In Case of Noble Metal Adsorption Agent 2C

Figure 8:
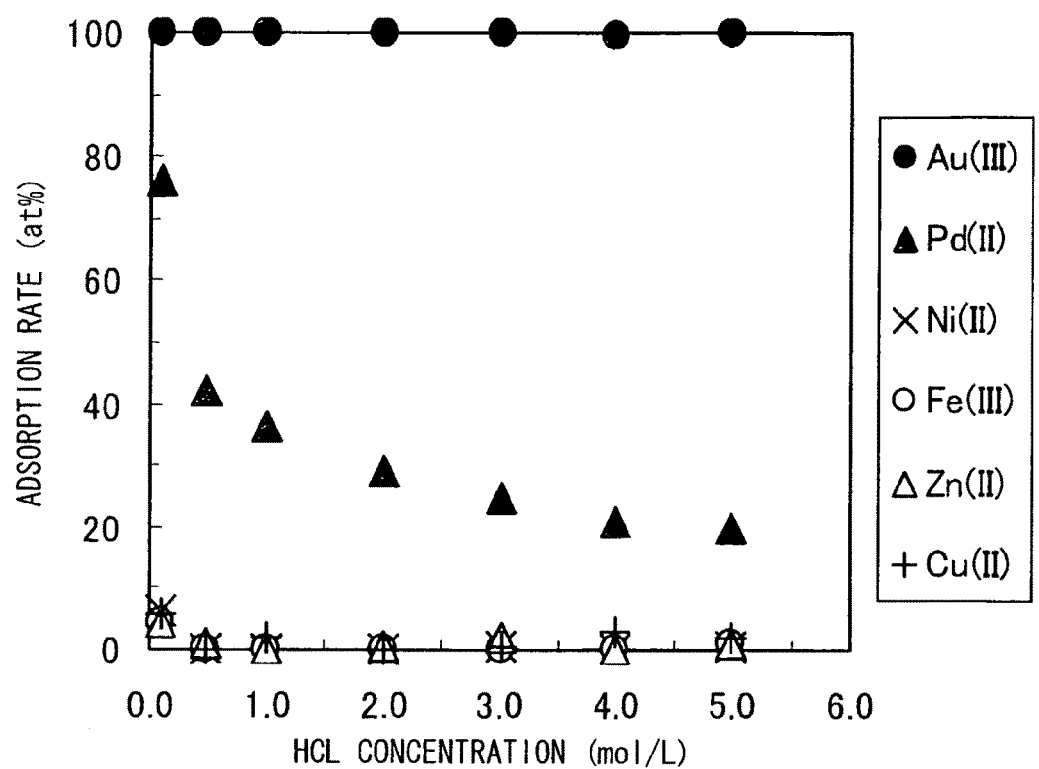
FIG. 8 is a graph showing an adsorption rate of a noble metal adsorption agent 2C.

The noble metal adsorption agent 2C instead of the noble metal adsorption agent 1A is used, and the retrieving process of the noble metal is performed similar to the case (2-1) of the noble metal adsorption agent 1A. The results of the measurements of the adsorption rate are shown in FIG. 8. As shown in FIG. 8, the elements of Au and Pd are selectively retrieved. Specifically, the element of Au is selectively retrieved compared with the element of Pd when the hydrochloric acid concentration (HCl concentration) is high.

3. Effects of Noble Metal Adsorption Agents and Retrieving Method of Noble Metals (3-1)

The noble metal adsorption agents 1A, 1B, 2A, 2B, 3A, 3B, 4A-1 to 4A-10 and retrieving methods of the noble metals with using these noble metal adsorption agents 1A, 1B, 2A, 2B, 3A, 3B, 4A-1 to 4A-10 provide to selectively retrieve the noble metals of Au, Pd and Pt from the liquid including base metals of Cu, Zn, Fe and Ni. Further, as described in the case (2-4), when multiple steps are combined, the specific noble metal is separated and retrieved from other noble metals.

Thus, the present disclosure teaches the retrieving method of the noble metals in mineral ore such as iron ore, and the retrieving method of the noble metals and recycling technique for the noble metals in plating waste liquid and process waste liquid in which an electric element is solved.

(3-2)

Natural substances, i.e., algae, are used for the present technique. Accordingly, environmental load is small, and a cost for processing the waste liquid is not high.

(3-3)

The noble metal adsorption agents in the present technique are manufactured from algae, which is cultured in large amount. Thus, the noble metal adsorption agents are easily manufactured, and the manufacturing cost is low.

(3-4)

The noble metal adsorption agents 2A, 2B, 4A-1 to 4A-10, 2C do not easily decay since dried powder is processed under a sulfuric treatment. Thus, the noble metal adsorption agents 2A, 2B, 4A-1 to 4A-10, 2C can be stored for a long term.

(3-5)

The noble metal adsorption agents 3A, 3B do not easily decay since dried powder is processed under a carbonization treatment. Thus, the noble metal adsorption agents 3A, 3B can be stored for a long term.

4. Analysis of Noble Metal Adsorption Agents

Figure 5:
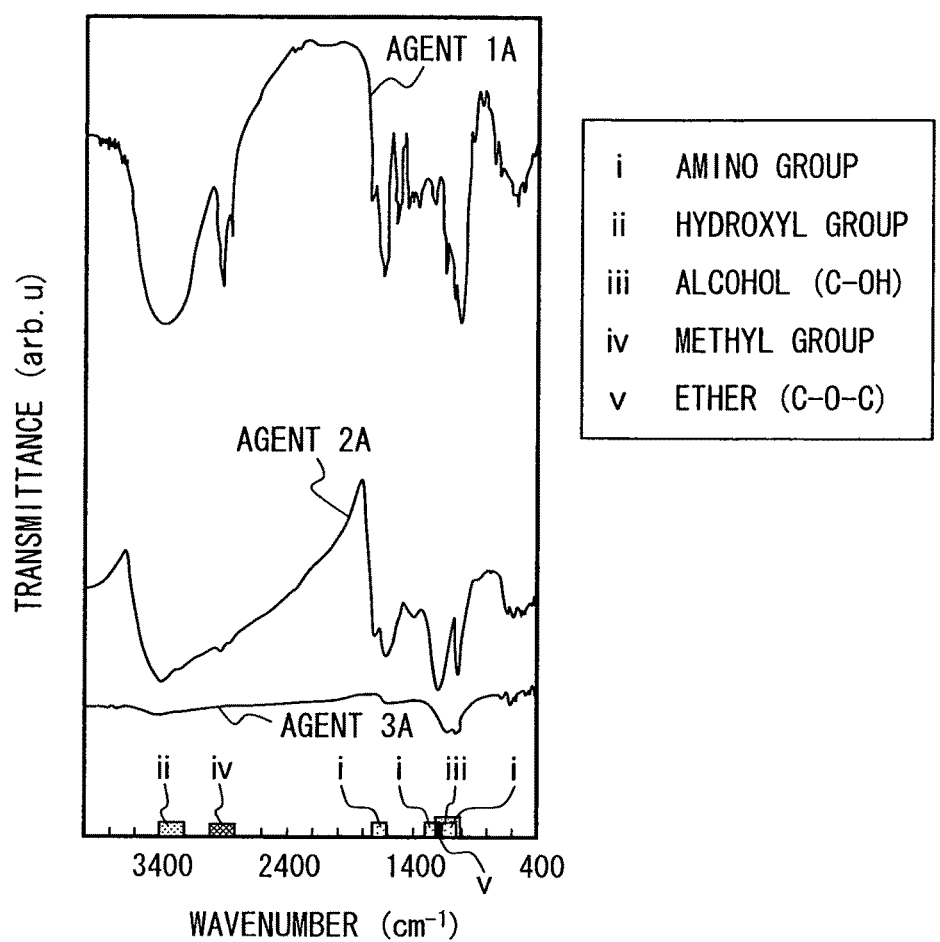
FIG. 5 is a graph showing transmittance of various agents measured by a FTIR method.

Each of the noble metal adsorption agents 1A, 1B, 2A, 2B, 3A, 3B is analyzed by a FTIR measurement method. The measurement results of the noble metal adsorption agents 1A, 2A, 3A are shown in FIG. 5. In FIG. 5, positions of absorption peaks of an amino group are in a range between 1600 $cm^{-1}$ and 1700 $cm^{-1}$, in a range between 1180 $cm^{-1}$ and 1280 $cm^{-1}$ and in a range between 1030 $cm^{-1}$ and 1130 $cm^{-1}$. A position of an absorption peak of a hydroxyl group is in a range between 3200 $cm^{-1}$ and 3400 $cm^{-1}$. A position of an absorption peak of an alcohol (i.e., C—OH) is in a range between 1000 $cm^{-1}$ and 1200 $cm^{-1}$. A position of an absorption peak of a methyl group is in a range between 2800 $cm^{-1}$ and 3000 $cm^{-1}$. A position of an absorption peak of an ether (i.e., C—O—C) is in a range between 1160 $cm^{-1}$ and 1200 $cm^{-1}$.

The measurement result of the noble metal adsorption agent 1B is substantially the same as the measurement result of the noble metal adsorption agent 1A. The measurement result of the noble metal adsorption agent 2B is substantially the same as the measurement result of the noble metal adsorption agent 2A. The measurement result of the noble metal adsorption agent 3B is substantially the same as the measurement result of the noble metal adsorption agent 3A.

Figure 9:
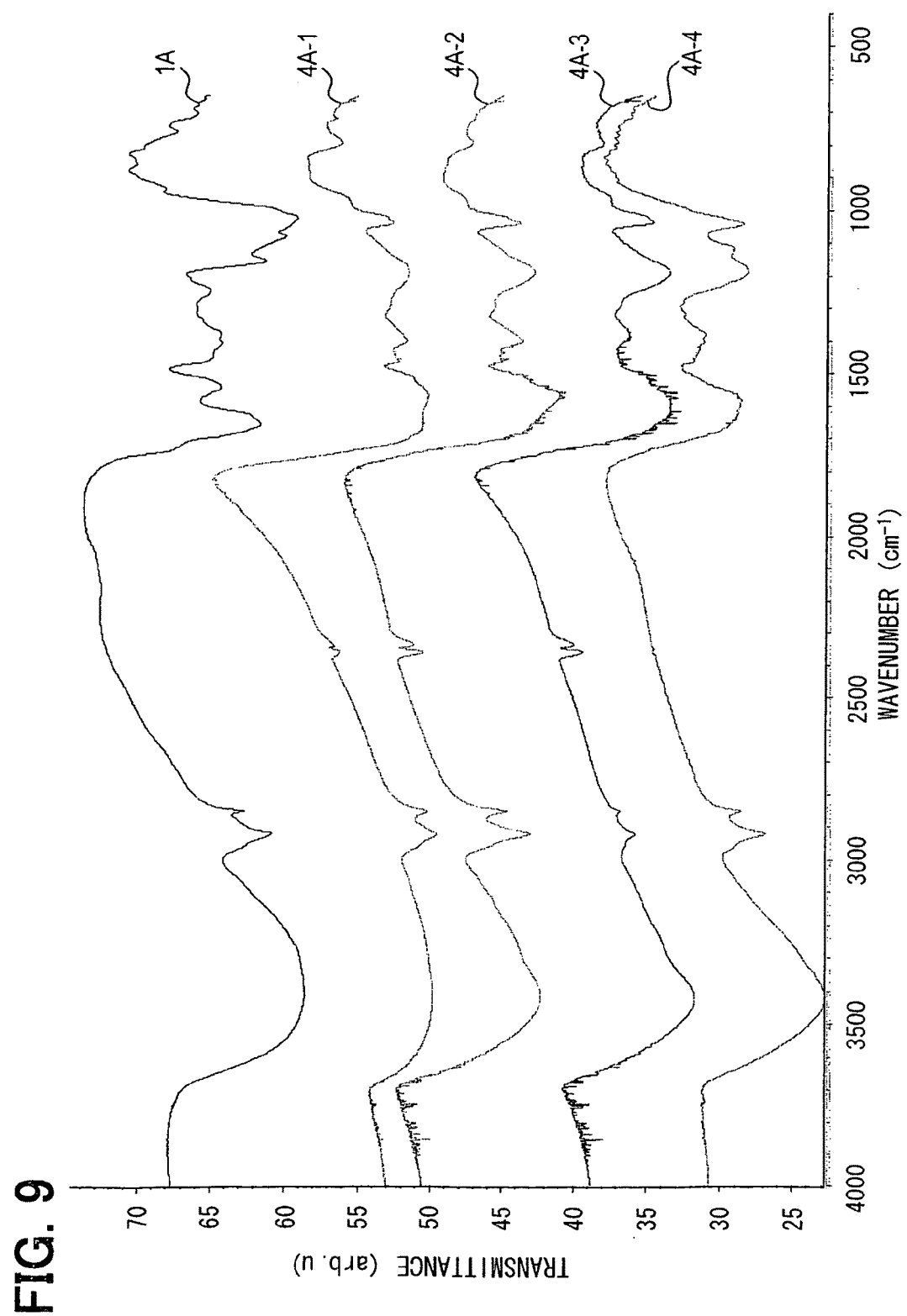
FIG. 9 is a graph showing transmittance of various agents measured by the FTIR method.

Further, each of the noble metal adsorption agents 4A-1 to 4A-4, 1A is analyzed by the FTIR measurement method. The measurement results are shown in FIG. 9.

Figure 10:
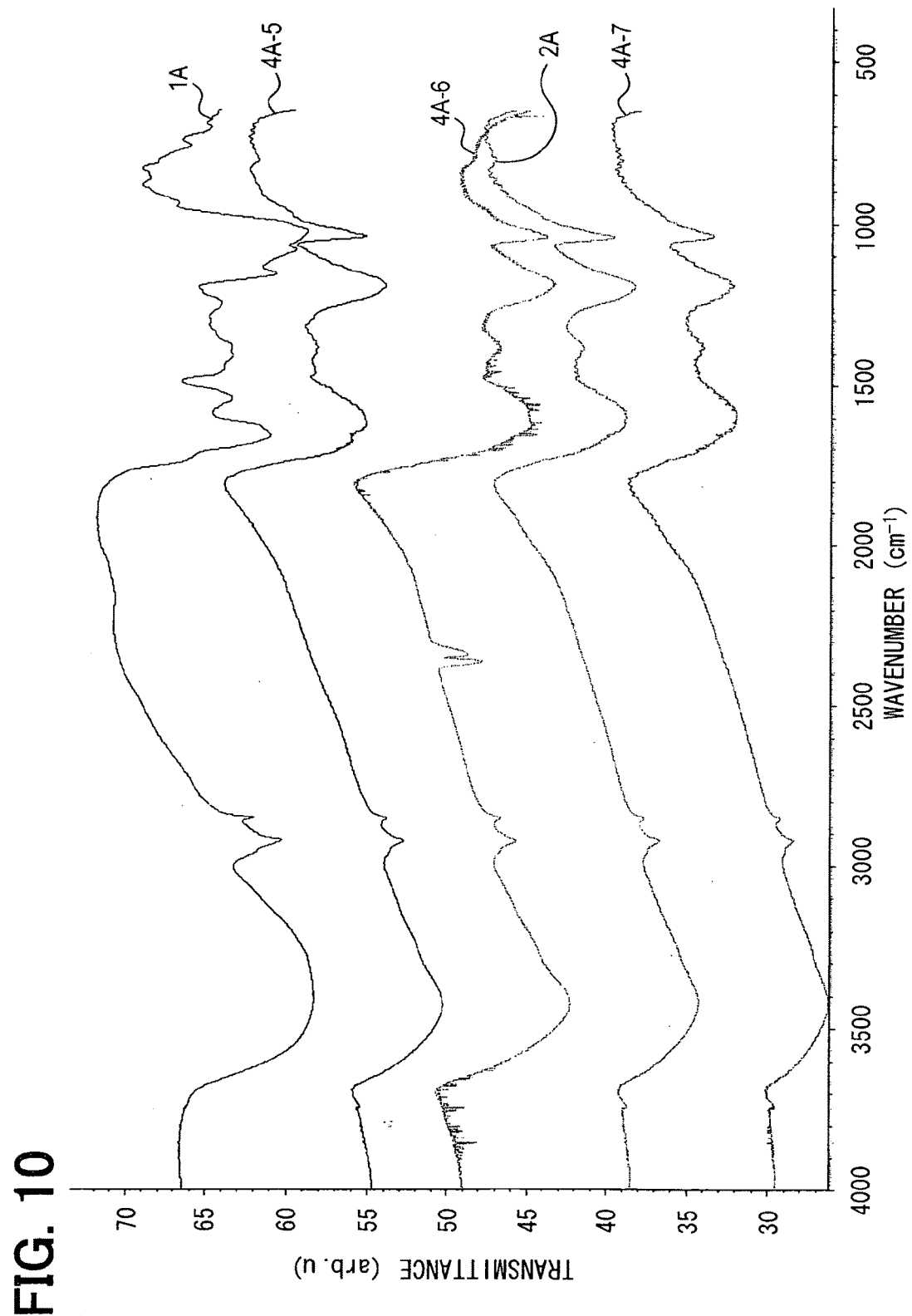
FIG. 10 is a graph showing transmittance of various agents measured by the FTIR method.

Furthermore, each of the noble metal adsorption agents 4A-5 to 4A-7, 1A, 2A is analyzed by the FTIR measurement method. The measurement results are shown in FIG. 10.

Figure 11:
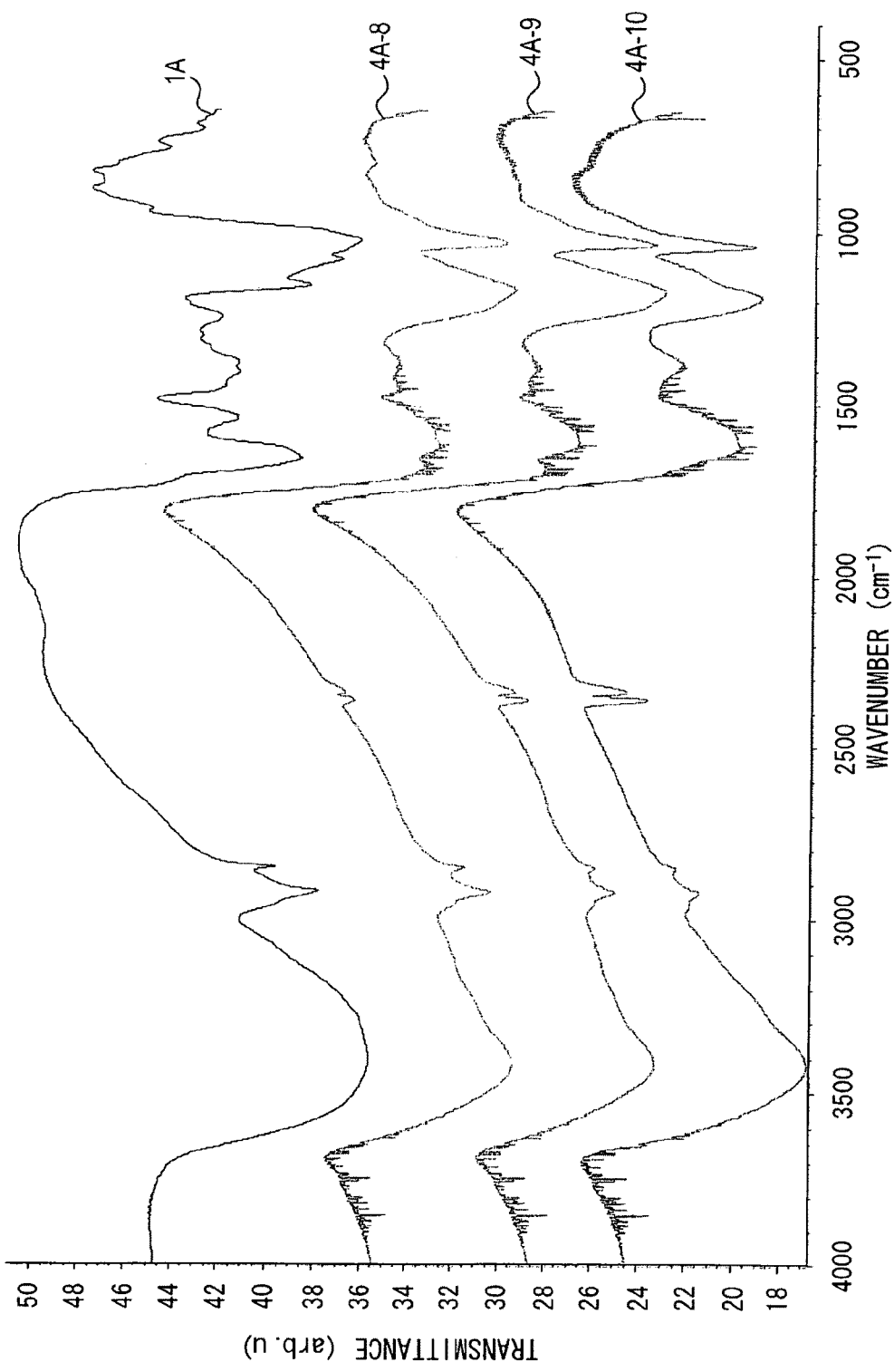
FIG. 11 is a graph showing transmittance of various agents measured by the FTIR method.

Further, each of the noble metal adsorption agents 4A-8 to 4A-10, 1A is analyzed by the FTIR measurement method. The measurement results are shown in FIG. 11.

Figure 12:
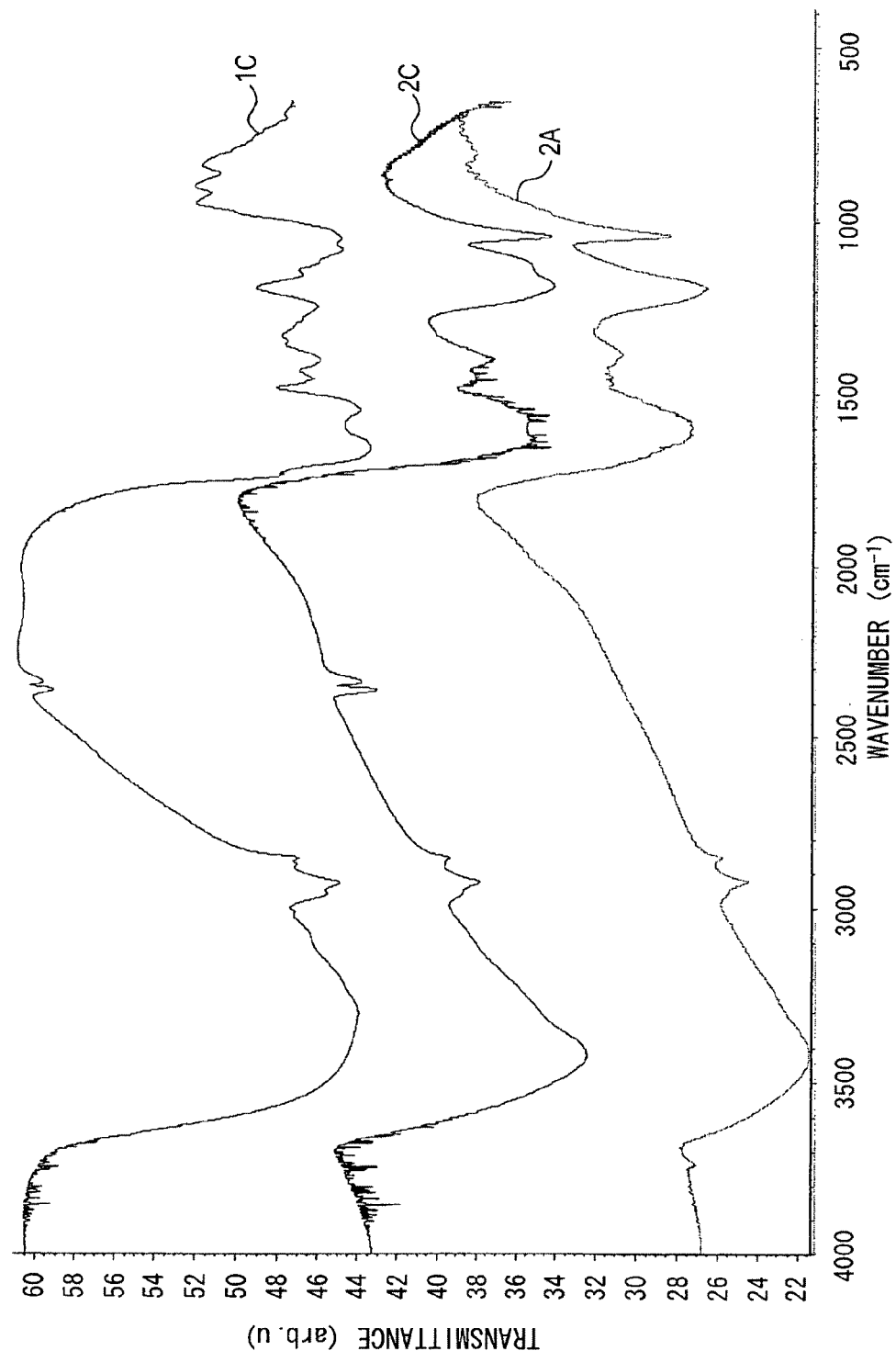
FIG. 12 is a graph showing transmittance of various agents measured by the FTIR method.

Furthermore, each of the noble metal adsorption agents 1C, 2C, 1A is analyzed by the FTIR measurement method. The measurement results are shown in FIG. 12.

The transmittance of the noble metal adsorption agents 1A, 1B, 1C includes an absorption peak of alcoholic hydroxyl group, a absorption peak of amino group, and a absorption peak of a methyl group as a functional group. The transmittance of the noble metal adsorption agents 2A, 2B, 4A-1 to 4A-10 includes an absorption peak of alcoholic hydroxyl group, a absorption peak of amino group, a absorption peak of a methyl group and a absorption peak of ether as a functional group. The transmittance of the noble metal adsorption agents 3A, 3B includes an absorption peak of alcoholic hydroxyl group and an absorption peak of amino group as a functional group.

Comparing the transmittance of the noble metal adsorption agents 1A, 1B, 1C with the transmittance of the noble metal adsorption agents 2A, 2B, 2C, 4A-1 to 4A-10, in the sulfuric acid treatment, the dehydration and condensation of the hydroxyl group occurs, so that an ether coupling is formed. Further, comparing the transmittance of the noble metal adsorption agents 1A, 1B with the transmittance of the noble metal adsorption agents 3A, 3B, in the carbonization treatment, the methyl group is disappeared. Further, the transmittance of all noble metal adsorption agents includes the absorption peak of the alcoholic hydroxyl group and the absorption peak of the amino group. Thus, it is considered that the alcoholic hydroxyl group and the amino group contribute to the adsorption and reduction of the noble metals.

(Modifications)

In the manufacturing methods of the noble metal adsorption agents 1A, 1B, 1C, the oily component is retrieved with using the organic solvent. Alternatively, without performing the oil component retrieval, the crushed micro algae may be used as the noble metal adsorption agents 1A, 1B, 1C. Further, the noble metal adsorption agents 2A, 2B, 3A, 3B, 4A-1 to 4A-10, 2C may be manufactured with using the noble metal adsorption agents 1A, 1B, 1C, which is manufactured without performing the oil component retrieval. In these cases, the above described effects are obtained.

In the manufacturing methods of the noble metal adsorption agents 2A, 2B, 2C, the noble metal adsorption agents 1A, 1B, 1C may be dipped in the strong acid such as concentrated sulfuric acid and concentrated hydrochloric acid at a room temperature for a long time. In these cases, the above described effects are obtained.

The liquid with the noble metals includes the aqua regalis. Alternatively, the liquid with the noble metals may include hydrochloric acid, which is prepared by blowing chlorine gas into the liquid. In this case, the adsorption properties of the noble metals with respect to the noble metal adsorption agents are changed according to the HCl concentration in the liquid, as shown in FIGS. 1-3 and 8.

The liquid may include an element of Ag. In this case, when chloride exists in the liquid, the silver chloride is deposited. Thus, the element of Ag is retrieved.

The retrieving method of the case (2-4) may not include the third step. Specifically, only the first and second steps in the retrieving method of the case (2-4) may be performed. In this case, the elements of Au and Pd are separated and retrieved.

The above disclosure has the following aspects.

According to a first aspect of the present disclosure, a noble metal adsorption agent includes: algae or residue of algae having an amino group as a functional group. By using the noble metal adsorption agent, a noble metal is selectively retrieved from base metals.

According to a second aspect of the present disclosure, a noble metal adsorption agent includes: a component, which is prepared by processing algae having an amino group as a functional group with strong acid. The strong acid has an acid level equal to or higher than a predetermined acid level. Here, the processing of the algae with the strong acid is defined as an insoluble treatment. By using the noble metal adsorption agent, a noble metal is selectively retrieved from base metals.

Further, a HCl concentration of the liquid may be controlled, and the noble metal adsorption agent is used for several times, so that a specific noble metal is separated and retrieved from other noble metals.

The processing of the algae with the strong acid is performed by pouring the algae in the strong acid. This processing may be performed at a room temperature. Alternatively, the processing may be performed under a condition that the strong acid is heated. When the strong acid is heated, a processing time is short. The processing time is preferable equal to or longer than one second.

Alternatively, the component may have an ether coupling absorption peak in a Fourier transform infrared spectroscopy measurement. When the component has the ether coupling absorption peak, the effect of retrieving the noble metal is improved.

According to a third aspect of the present disclosure, a noble metal adsorption agent includes: a component, which is prepared by carbonizing algae or residue of algae having an amino group as a functional group. By using the noble metal adsorption agent, a noble metal is selectively retrieved from base metals.

The carbonizing of the algae or the residue of algae may be performed at temperature equal to or higher than 800° C.

Alternatively, the algae may be a micro algae. The micro algae is a mono cellular algae. The dimensions of the algae may be equal to or smaller than a few micrometers.

The noble metal adsorption agent is, for example, a powder. The diameter of powder is preferably in a range between 10 micrometers and 150 micrometers in view of clogging of a device and adsorption surface area. The diameter of powder is more preferably in a range between 50 micrometers and 120 micrometers.

According to a fourth aspect of the present disclosure, a method for retrieving a noble metal includes: adsorbing the noble metal on the noble metal adsorption agent according to the first aspect of the present disclosure; and retrieving the noble metal. The noble metal is solved in a liquid. By using the noble metal adsorption agent, a noble metal is selectively retrieved from base metals.

According to a fifth aspect of the present disclosure, a method for retrieving a noble metal includes: pouring the noble metal adsorption agent according to the second aspect of the present disclosure in a liquid, which includes an element of gold and has a hydrochloric acid concentration equal to or higher than 2 mol/L; adsorbing the element of gold on the noble metal adsorption agent; and retrieving the element of gold. By using the noble metal adsorption agent, a noble metal is selectively retrieved from base metals. Further, the element of gold is selectively retrieved from other noble metals.

According to a sixth aspect of the present disclosure, a method for retrieving a noble metal includes: pouring the noble metal adsorption agent according to the first aspect of the present disclosure in a liquid, which includes an element of palladium and has a hydrochloric acid concentration lower than 2 mol/L; adsorbing the element of palladium on the noble metal adsorption agent; and retrieving the element of palladium. By using the noble metal adsorption agent, a noble metal is selectively retrieved from base metals.

According to a seventh aspect of the present disclosure, a method for retrieving a noble metal includes: pouring the noble metal adsorption agent according to the second aspect of the present disclosure in a liquid, which includes an element of gold and an element of palladium and has a hydrochloric acid concentration equal to or higher than 2 mol/L, wherein the noble metal adsorption agent according to the second aspect of the present disclosure is defined as a first noble metal adsorption agent; adsorbing the element of gold on the first noble metal adsorption agent; retrieving the element of gold; reducing the hydrochloric acid concentration lower than 2 mol/L after the retrieving of the element of gold; pouring the noble metal adsorption agent according to the first aspect of the present disclosure in the liquid after the reducing of the hydrochloric acid concentration lower than 2 mol/L, wherein the noble metal adsorption agent according to the first aspect of the present disclosure is defined as a second noble metal adsorption agent; adsorbing the element of palladium on the second noble metal adsorption agent; and retrieving the element of palladium. By using the first and second noble metal adsorption agents, the elements of gold and palladium are selectively retrieved from base metals. Further, the element of gold is retrieved, and the element of palladium is retrieved independently. Thus, the elements of gold and palladium are separately retrieved.

According to a eighth aspect of the present disclosure, a method for retrieving a noble metal includes: pouring the noble metal adsorption agent according to the second aspect of the present disclosure in a liquid, which includes an element of gold, an element of palladium and an element of platinum, and has a hydrochloric acid concentration equal to or higher than 2 mol/L, wherein the noble metal adsorption agent according to the second aspect of the present disclosure is defined as a first noble metal adsorption agent; adsorbing the element of gold on the first noble metal adsorption agent; retrieving the element of gold; reducing the hydrochloric acid concentration lower than 2 mol/L after the retrieving of the element of gold; pouring the noble metal adsorption agent according to the first aspect of the present disclosure in the liquid after the reducing of the hydrochloric acid concentration lower than 2 mol/L, wherein the noble metal adsorption agent according to the first aspect of the present disclosure is defined as a second noble metal adsorption agent; adsorbing the element of palladium on the second noble metal adsorption agent; retrieving the element of palladium; pouring the noble metal adsorption agent according to the third aspect of the present disclosure in the liquid after the retrieving of the element of palladium, wherein the noble metal adsorption agent according to the third aspect of the present disclosure is defined as a third noble metal adsorption agent; adsorbing the element of platinum on the third noble metal adsorption agent; and retrieving the element of platinum. By using the first to third noble metal adsorption agents, the elements of gold, palladium and platinum are selectively retrieved from base metals. Further, the element of gold is retrieved, the element of palladium is retrieved, and the element of platinum is retrieved, independently. Thus, the elements of gold, palladium and platinum are separately retrieved.

Alternatively, the retrieving of the element of palladium may include: processing the second noble metal adsorption agent, on which the element of palladium is adsorbed, with ammonia; and removing the element of palladium from the second noble metal adsorption agent. In this case, the element of platinum is easily retrieved.

According to a ninth aspect of the present disclosure, a method for manufacturing a noble metal adsorption agent includes: retrieving a micro algae by a centrifugal separation method or by using flocculant; drying a retrieved micro algae; crushing a dried micro algae so that a diameter of the micro algae becomes about 100 micrometers; dipping a crushed micro algae in organic solvent prepared by mixing chloroform and methanol with a ratio between chloroform and methanol of 2:1 so that an oily component of the micro algae is solved into the organic solvent; evaporating the organic solvent so that the oily component is retrieved; and removing the oil from the oily component so that a residue of the micro algae is obtained. The residue of the micro algae provides the noble metal adsorption agent. By using the noble metal adsorption agent, a noble metal is selectively retrieved from base metals.

Alternatively, the flocculant may be one of aluminum sulfate series flocculant, cationic polymer flocculant, and ampholytic polymer flocculant. The micro algae is defined by the International Deposition number of FERM BP-10484 or FERM BP-10485. A genus of the micro algae is *Pseudochoricystis*. A species of the micro algae is *Ellipsoidea*. A strain of the micro algae is MBIC11204 or MBIC11220.

Further, the method may further include: dipping the noble metal adsorption agent in concentrated sulfuric acid at a predetermined temperature for a predetermined time; neutralizing a dipped noble metal adsorption agent in the concentrated sulfuric acid with sodium hydrogen carbonate; filtering a neutralized concentrated sulfuric acid with the noble metal adsorption agent; and drying a filtered noble metal adsorption agent. A dried noble metal adsorption agent provides a second noble metal adsorption agent.

Alternatively, the method may further include: heating the noble metal adsorption agent at a predetermined temperature in atmosphere without oxygen substantially so that the noble metal adsorption agent is carbonized. A carbonized noble metal adsorption agent provides a third noble metal adsorption agent.

Alternatively, the flocculant may be one of aluminum sulfate series flocculant, cationic polymer flocculant, and ampholytic polymer flocculant. The micro algae is defined by a fresh chlorella. A genus, a species and a strain of the fresh chlorella are defined as chlorella vulgaris chikugo strain.

Further, the method may further include: dipping the noble metal adsorption agent in concentrated sulfuric acid at a predetermined temperature for a predetermined time; neutralizing a dipped noble metal adsorption agent in the concentrated sulfuric acid with sodium hydrogen carbonate; filtering a neutralized concentrated sulfuric acid with the noble metal adsorption agent; and drying a filtered noble metal adsorption agent. A dried noble metal adsorption agent provides a fourth noble metal adsorption agent.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:
1. A noble metal adsorption agent comprising:
a sulfuric acid processed residue of algae having an amino group as a functional group, wherein the sulfuric acid processed residue of algae comprises ether as a functional group; and the noble metal adsorption agent is capable of selectively retrieving Pd.

2. The noble metal adsorption agent according to claim 1, wherein the sulfuric acid processed residue of algae has an ether coupling absorption peak in a Fourier transform infrared spectroscopy measurement.

3. The noble metal adsorption agent according to claim 1, wherein the algae is a micro algae.

4. A noble metal adsorption agent in combination with a noble metal, the combination comprising:

a residue of algae having an amino group as a functional group, the residue of algae being processed by sulfuric acid; wherein the sulfuric acid processed residue of algae comprises ether as a functional group; and the noble metal is selectively retrieved by the noble metal adsorption agent; wherein the noble metal is Pd.

\* \* \* \* \*